July 20, 1965   W. CARLS   3,195,572
MANIFOLD CONSTRUCTION
Filed Nov. 14, 1960   2 Sheets-Sheet 1
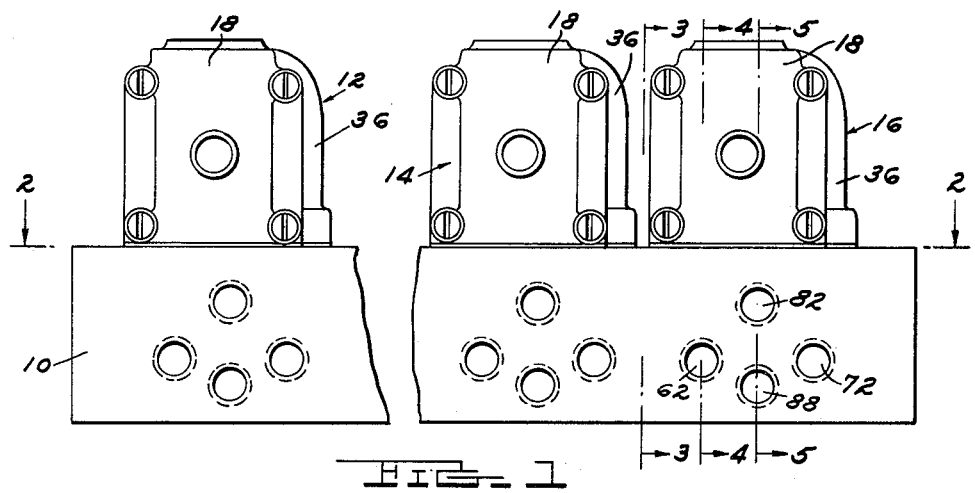
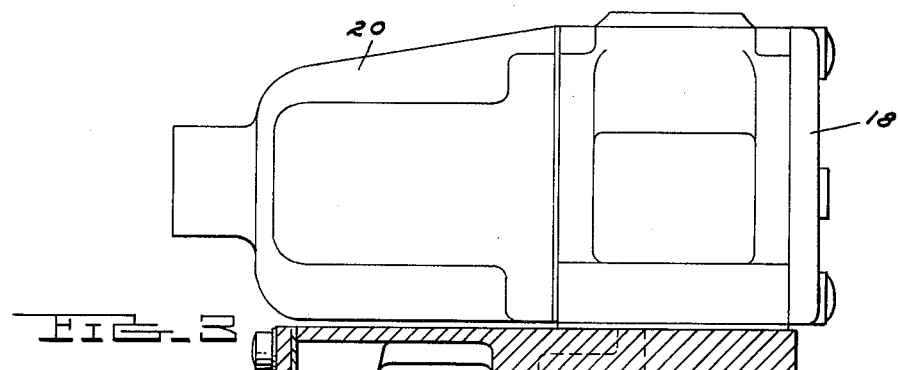
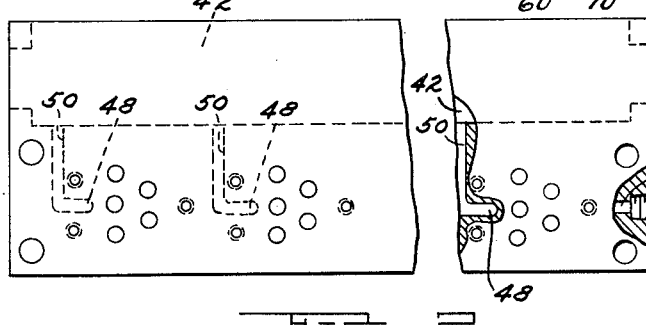
INVENTOR.
WILLIAM CARLS
BY
Barnes, Kisselle,
Raisch & Choate
ATTORNEYS

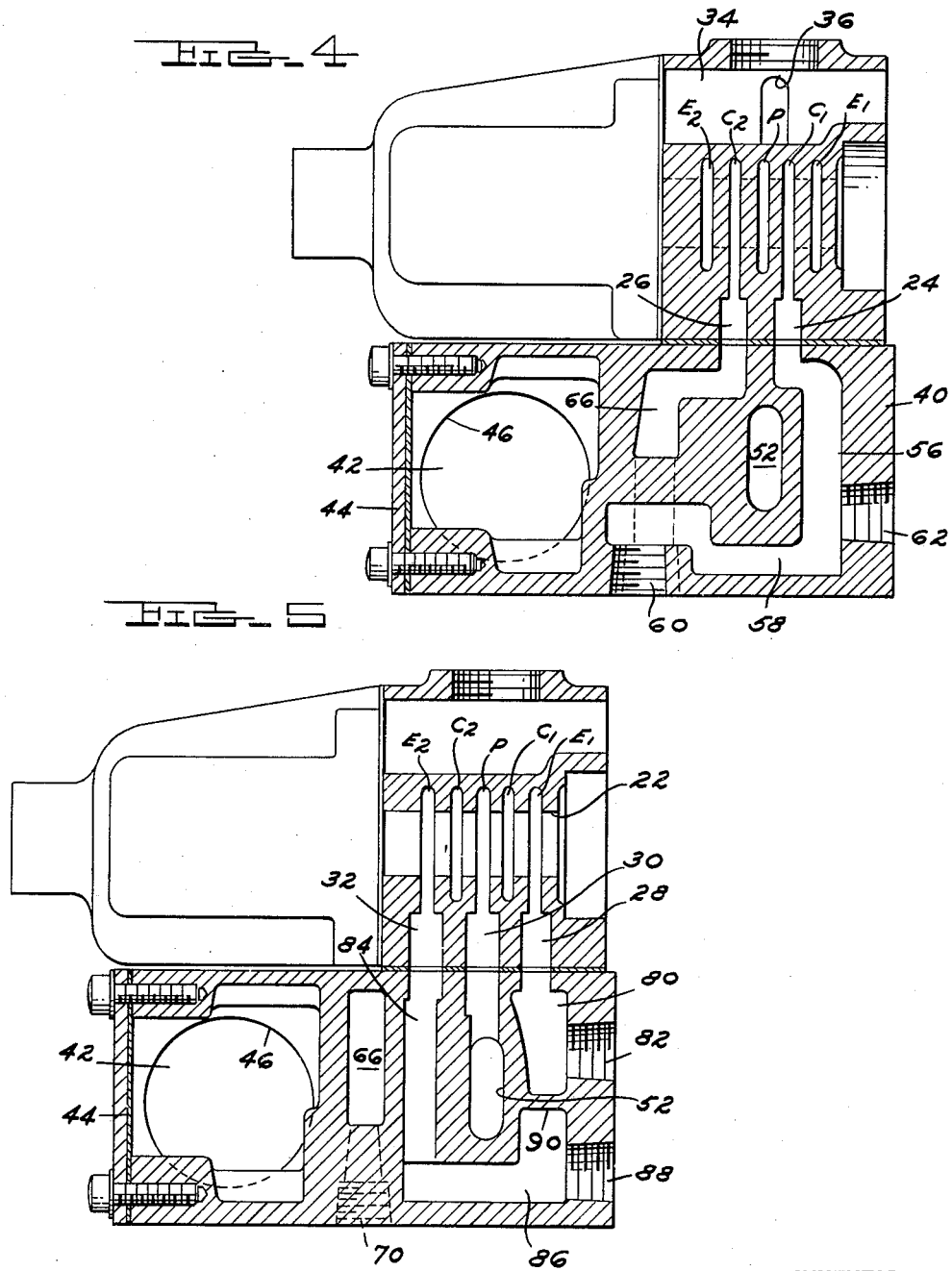

United States Patent Office 3,195,572
Patented July 20, 1965

3,195,572
MANIFOLD CONSTRUCTION
William Carls, Highland, Mich.
Filed Nov. 14, 1960, Ser. No. 69,106
1 Claim. (Cl. 137—608)

This invention relates to a valve and manifold combination, particularly for use with fluid valves and more particularly for use with air valves.

The manifold is especially adapted for use in industrial plants where control valves are utilized to direct actuating fluid to various piston-cylinder power devices on automatic equipment. The controlling air valves can be mounted side by side on the manifold and actuated manually or by solenoid controls.

It is an object of the invention to provide a manifold for mounting a plurality of valves, said manifold to contain not only a common pressure supply passage but also independent exhaust passages and independent cylinder passages for each valve, together with a chamber for electrical wires and conduits which enables all of the wires to be enclosed.

It is an object of the present invention to provide all of the above in a very compact manifold in which the passages are formed in a novel manner to accomplish the result. The cylinder passages are two L-shaped passages reversed with respect to each other, one of which has a jog in one leg to permit it to interfit with the other, and the exhaust passages are two L-shaped passages which are nested to accommodate the exhaust ports in close proximity to the cylinder ports, the cylinder ports each having a leg run near the bottom of the device to permit connection either at the bottom or the side of the manifold.

Another object is the provision of a valve for co-operating with said manifold wherein five drilled or cored holes in the top of the manifold serve as a connection for the valves with the manifold.

Other objects and features of the invention relating to details of construction and operation will be apparent in the following description and claim.

In the drawings:

FIGURE 1 illustrates a side elevation of a manifold with valves mounted thereon.

FIGURE 2 is a top plan view of the manifold alone one line 2—2 of FIGURE 1.

FIGURE 3 is a sectional view on line 3—3 of FIGURE 1.

FIGURE 4 is a sectional view on line 4—4 of FIGURE 1 illustrating the cylinder passages.

FIGURE 5 is a sectional view on line 5—5 of FIGURE 1 showing the exhaust passages.

Referring to the drawings:

The manifold generally is illustrated at 10 showing valve housings 12, 14 and 16 fastened to the manifold by bolts which are not shown. On one end of each valve housing is a plate 18 and on the other end is a solenoid housing 20. Each valve housing is intended to enclose an operating spool (not shown) and each housing therefore has a bore 22 for the spool, together with a pressure port P, exhaust ports E1 and E2 and cylinder ports C1 and C2. The two cylinder ports C1 and C2 terminate at the bottom of the valve housing in ports 24 and 26, whereas the pressure port and the two exhaust ports terminate at the bottom of the valve housing in ports 28, 30 and 32 aligned transversely of the valve and spaced from the ports 24 and 26. Each valve has a top chamber 34 connected through a side channel 36 to the valve manifold between the valves in a manner which permits the wires from the solenoid connection to be passed down through the valve housing into the manifold.

Looking now at the manifold itself, the casting 40 has an open side chamber 42 closed by a side plate 44. Openings 46 at each end of the manifold permit access from one manifold to another if they are arranged in tandem relationship. The side channels 36 of the valve housings lead downwardly to connect with openings 48 in the top of the manifold, which openings slant axially of the manifold and then connect with a downward transverse passage 50 leading to the side chamber 42. The air pressure is supplied to the manifold through a common supply passage 52 which passes axially through the manifold parallel to the chamber 42. A suitable connection opening 54 at the end of the manifold is provided for an air supply hose or conduit.

At each valve station on the flat top surface, there are four L-shaped passages, two for each cylinder connection and two for each exhaust connection. In FIGURE 4, one L-shaped cylinder passage is shown having a vertical leg formed by passage 56 connecting to port 24 of the valve and a horizontal leg formed by passage 58 extending transversely of the manifold having a cylinder port 60 on the bottom and a cylinder port 62 on the side.

The other L-shaped cylinder passage has a vertical leg formed by passage 66 connecting to the port 26 and this leg jogs longitudinally of the manifold and drops down to a horizontal leg formed by passage 68 (FIGURE 3) similar to 58, terminating in a cylinder port 72 on the side of the manifold and having an optional cylinder port 70 on the bottom of the manifold similar to port 60 associated with passage 58. (See FIGURE 3.) Thus two L-shaped legs reversed relative to each other form the cylinder port passages (FIGURES 3, 4).

Referring to FIGURE 5, the exhaust port passages are again formed by two L-shaped passages which nest with each other. Port 28 of the valve is connected to the passage 80 which forms the vertical leg of the one L-shaped port which has a horizontal traverse into a side port 82 of the manifold. The other exhaust port has a passage 84 forming a vertical leg with horizontal passage 86 terminating in a side port 88, the vertical leg connecting the port 32 of the valve exhaust port E2. The two L-shaped passages for the exhaust are separated by the interposed pressure passage 52.

Thus, in a highly compact design, the cylinder and the exhaust passages are arranged at each valve station. A suitable valve spool in the valve bore 22 serves to pass pressure to one cylinder port while connecting the other to exhaust and vice versa. Also, the solenoid wire connections are all contained within the valve housing and manifold to present a neat and safe design, which can be readily serviced and easily tandemed if desired. The cylinder port connections being optional at the side edge or bottom surface increases the versatility of the construction. The openings not used would be plugged suitably either by a screw plug or a gasketed surface.

It will be understood that even though these valves are shown with a dual exhaust porting, the exhaust passages can be unified by drilling out the separating web 90 (FIG. 5) from the top of the manifold to connect passages 80 and 86. This web is designed to be thin so this drilling can be easily done. In this way a silencer can be used for the common exhaust. If one exhaust is to be restricted or used for an automatic control of another valve, the dual outlet is preferred. Thus the nesting arrangement of the exhaust passages adds to the versatility of the unit.

Reference is made to my co-pending application Serial No. 69,107, filed Nov. 14, 1960, now Patent No. 3,135,-290, wherein related subject matter is disclosed and claimed.

I claim:

A manifold for multiple valve bank assembly comprising:

(a) a one-piece integral manifold block having a first flat surface for a plurality of valve mount stations, each with a plurality of ports grouped together and terminal at said surface, said ports including a pressure port, two exhaust and two cylinder ports, said block having a second surface normal to said first flat surface forming an edge of said block having in relation to each valve station two exhaust and two cylinder ports terminal at said second surface, said block having a third surface parallel to and spaced from said first surface to form the bottom of the manifold, said block having cored passages including (b) an L-shaped passage for each of said exhaust and cylinder ports, said cylinder port passages comprising two L-shaped passages, one reversed to the other, having a vertical leg terminating at the cylinder ports of the first flat surface and a horizontal leg extending in close proximity to and parallel with said third surface to a cylinder port at said second surface, said horizontal legs being spaced longitudinally of the block, and (c) said exhaust port passages comprising two L-shaped passages between said horizontal legs, one nested above the other, each terminating at said first and second surfaces in laterally spaced relation, and (d) a pressure passage extending longitudinally of said block above and between the respective horizontal and vertical legs of said exhaust and cylinder passages with a connection at each valve station to the pressure port of said first surface.

References Cited by the Examiner

UNITED STATES PATENTS

| 2,057,087 | 10/36 | Millar | 137—622 XR |
| 2,871,886 | 2/59 | Obrebski et al. | 138—111 |

FOREIGN PATENTS 1,071,287   1954   France.

WILLIAM F. O'DEA, *Primary Examiner.*

EDWARD V. BENHAM, ISADOR WEIL, *Examiners.*